United States Patent Office 3,441,867
Patented Apr. 29, 1969

3,441,867
MASTER AUTOMATIC GAIN CONTROL OF SEISMIC AMPLIFIERS
Thomas M. Davison, Houston, Tex., assignor to Dresser Systems, Inc., Dallas, Tex., a corporation of Delaware
Filed June 30, 1967, Ser. No. 650,524
Int. Cl. H03f *3/66;* H03g *3/20, 5/16*
U.S. Cl. 330—52
10 Claims

ABSTRACT OF THE DISCLOSURE

A plurality of seismic geophone stations are connected to a 4000 hertz oscillator and ring modulator circuit, the output of which is coupled into a plurality of individual seismic amplifiers, one amplifier for each geophone station. The output voltage from each geophone station is also respectively connected into each of the seismic amplifiers. Each seismic amplifier has a plurality of photo resistive units responsive to a lamp circuit driven by the varying amplitude of the modulated oscillator signal, the gain of each amplifier having an inverse relationship to the amplitude of the modulated oscillator signal.

Background of the invention

The invention relates to a method and an apparatus for automatically controlling the gain of a plurality of amplifiers and, more particularly, for automatically controlling the gain of a plurality of seismic amplifiers.

As is well known in the art, seismic amplifiers having automatic gain control provide better results than other types of gain control, and consequently, there have been developed various methods and apparatus for achieving such automatic control. A common characteristic of such prior art systems, especially in seismic systems having a plurality of geophone inputs, is that of providing feedback from the output of the amplifiers to the input of the system. While such systems have had varying degrees of success, they have inherently been troubled with phase shifts, instability and time delay in the closed loop system.

It is therefore the primary object of this invention to provide a method and apparatus for automatically controlling the gain of a plurality of seismic amplifiers without sensing the low frequency, signal portion of the amplifier outputs for control of the amplifier gain.

It is another object of the invention to provide a method and apparatus having a plurality of seismic amplifiers wherein all the amplifiers are controlled from a master automatic gain control which is not affected by the signal outputs of the amplifiers.

It is still another object of the invention to provide a method and apparatus having a plurality of seismic amplifiers wherein all the amplifiers are controlled from a master automatic gain control causing the gain of the seismic amplifiers to vary inversely as does the combination of the input voltages from a plurality of seismic geophones.

The objects of the invention are accomplished, broadly, by the provision of a centralized, "open loop" automatic gain control circuit which does not depend upon the signal portion of the output of a plurality of amplifiers, but yet controls the gain of each of the amplifiers.

These and other objects, features and advantages of the invention will be apparent from the following detailed description when taken in conjunction with the accompanying drawings in which.

Figure 1:
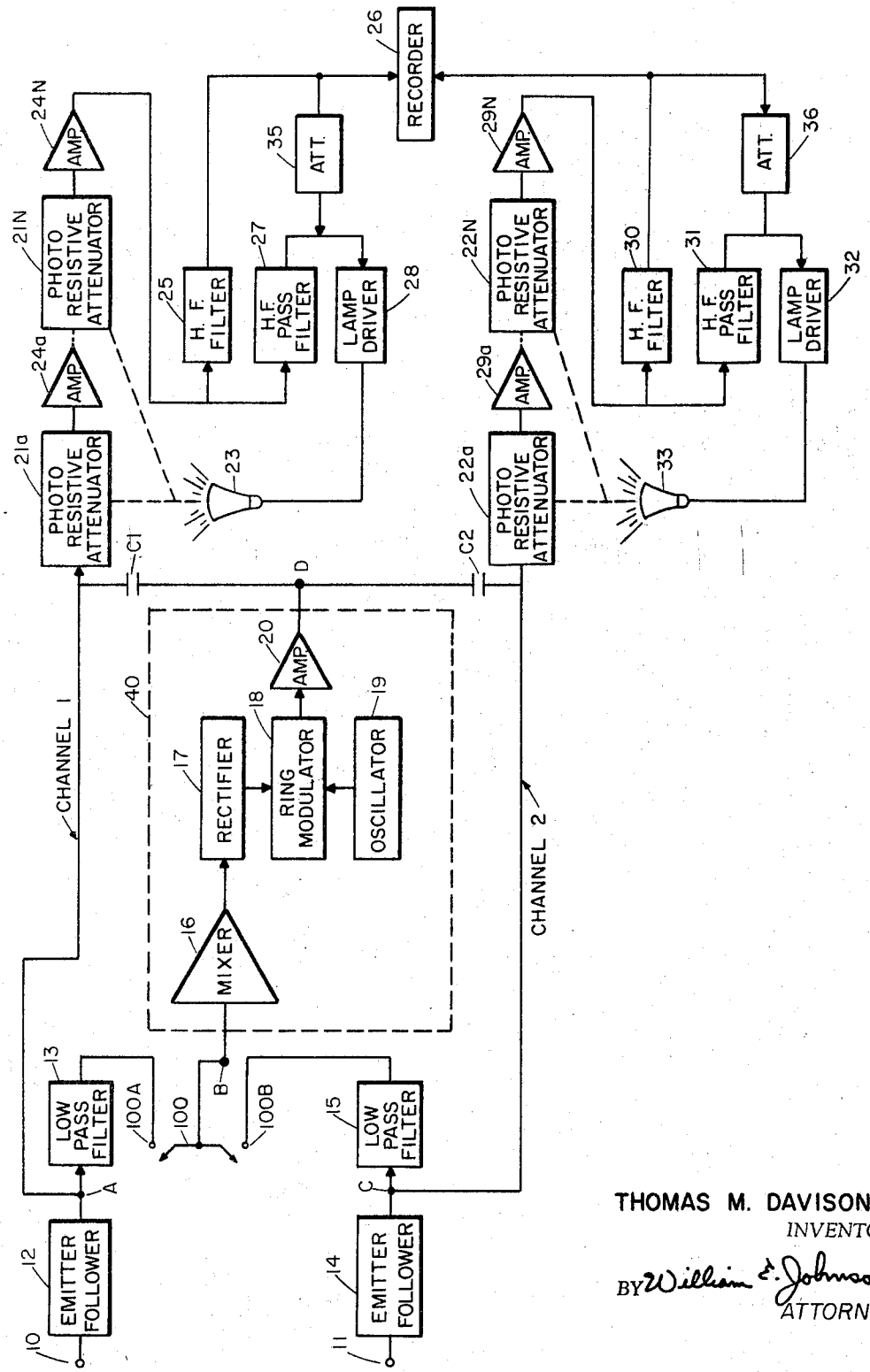
FIGURE 1 is a block diagram of circuitry for automatically controlling the gain of a plurality of amplifiers according to the invention.

Referring now in detail to FIG. 1, there is illustrated a pair of input terminals 10 and 11 which could be connected, for example, to a pair of seismic geophone stations (not illustrated). Terminal 10 is connected through an emitter follower stage 12 to junction A, which in turn is connected through a low pass filter stage 13 to the mixer switch junction 100A. Likewise, terminal 11 is connected through an emitter follower stage 14 to junction C which is connected through a low pass filter stage 15 to the mixer switch junction 100B.

It should be appreciated that while there have been illustrated a pair of channels having inputs 10 and 11, respectively, N channels could be accommodated with the circuitry according to the invention. For example, a typical seismic amplifier system might have 24 geophone stations, the outputs of which would be respectively connected through 24 emitter followers and 24 low pass filters to the mixer switch 100.

Since there is provided a switching junction 100N for each of the N input channels, it should be appreciated that any combination of the channels can be switched in or out of the master automatic gain control system herein described. The channels which are switched into the master control are then combined at junction B.

The signals appearing at junction B are coupled through the mixer stage 16 into a rectifier stage 17, the DC output of which is connected into the ring modulator 18. The output from the oscillator 19, for example, a 4000 hertz signal voltage, is also coupled into the modulator 18. The modulated high frequency output from the stage 18 is coupled through amplifier 20 to junction D, which in turn is coupled, respectively, through capacitors C1 and C2, to the inputs of the photoresistive attenuators 21a and 22a. The junctions A and C are also respectively connected to the attenuators 21a and 22a. The unit 21a is a photo sensitive attenuator coupled to an amplifier 24a, wherein the overall gain of the combination varies inversely as does the seismic signal appearing at input terminal 10, the gain of the unit being affected by the lamp 23. Additional photoresistive attenuators 21n and amplifiers 24n are connected to the output of the amplifier 24a, the gain of the "n" combinations also being affected by the lamp 23.

It should be appreciated that any number of photoresistive attenuator and amplifier units could be used, depending upon the degree of gain control and amplification desired.

The output of unit 24n is connected to a high frequency filter stage 25, the output of which is an amplified version of the signal originally appearing at input terminal 10, and which is free of the high frequency oscillator signal. The output signals from the filter stage 25 are coupled into the recorder 26.

The output of unit 24n is also connected through a high frequency pass filter stage 27 to a lamp driver circuit 28 for controlling the intensity of the lamp 23.

In a similar manner, the photo resistive units 22n and 29n are connected to the high frequency filter stage 30, the high frequency pass filter 31 and the lamp driver circuit 32 for controlling the intensity of the lamp 33.

The output of the high frequency filter stage 30 is coupled into the recorder 26 as an amplified version of the signal originally appearing at input terminal 11.

The output of the high frequency filter stage 25 is also connected to the input of the lamp driver stage 28 through an attenuator circuit 35, having an attenuation factor of, for example, 10:1. The attenuation circuit is set to trip only at some pre-selected level of low frequency, signal output from the amplifier 24n. When the master gain control circuit is performing in a desired manner, the attenuator 35 does not operate within the gain control circuitry. However, should the low frequency signal "run away" for some reason, the attenuator 35 will act as an override and cause an attenuated portion of the low frequency output to drive the lamp circuit 23 and reduce the gain of the units 21n and 24n.

In a similar manner, the attenuator stage 36 acts as an override for channel 2.

As previously discussed with respect to the input terminals 10 and 11, the circuitry according to the invention can be readily modified to accommodate any number of channels desired. It should be appreciated, however, that the preferred embodiment includes the photo resistive attenuators 21a–21n and amplifiers 24a–24n, the filter 25 and 27, lamp driver 28 and lamp 23 for each such channel, as well as a connection to the recorder 26.

It should be appreciated that the recorder 26 can be a single or multichannel digital or analog magnetic tape recorder, a recording galvanometer, a strip recorder, or any of the other various conventional recorders.

In the operation of the circuitry of FIG. 1, a pair of input signals, for example, from a pair of seismic geophone stations, are respectively impressed upon the input terminals 10 and 11. After each signal passes through its respective emitter follower and low pass filter stage to junction B, the two signals are combined in the mixer stage 16, and the instantaneous average of the combined signals is then rectified to provide a DC voltage to the ring modulator 18. The high frequency oscillator 19 provides a rider or control frequency, for example, of 4000 hertz. Thus, the output of the ring modulator 18 is a 4000 hertz rider frequency signal having an amplitude that is a linear function of the averaged amplitude of the sampled seismic signals appearing at input terminals 10 and 11.

The output of the modulator 18 is then coupled through the amplifier 20 to junction D, which in turn is coupled back into the individual channels 1 and 2 through the capacitors C1 and C2, respectively.

The input signals at junctions A and C also continue, respectively, in channels 1 and 2, the capacitors C1 and C2 preventing intermixing of the seismic signals in each channel. Thus, the input to the photo resistive attenuator 21a comprises the low frequency signal from junction A, as well as the rider frequency signal whose amplitude is a function of the signal from junction B.

In a similar manner, the input to the photoresistive unit 22a comprises the low frequency signal from junction C, as well as the rider frequency signal whose amplitude is a function of the signal from junction B.

As the combined signals pass through the photo resistive attenuators and amplifiers, the signal, for example, from junction A, is exposed to a varying amplification therein whose gain is a function of the intensity of the lamp 23. The varying amplitude rider frequency signal passes through the filter 27, causing the lamp driver 28 to modify the intensity of the lamp 23. Thus, as the amplitude of the signal at junction D increases, the lamp 23 intensity decreases, decreasing the amplification through elements 21 and 24, and conversely, as the amplitude of the signal at junction D decreases, the amplification through elements 21 and 24 increases.

It should be appreciated that the lamp, photoresistive attenuators and amplifiers associated with channel 2 operate in a similar manner.

As the signals from junctions A and C pass through the verying gain amplifiers above described, they are then coupled, respectively, through the high frequency filters 25 and 30, thus being free of the modulated rider frequency to the inputs of the recorder 26.

Figure 2:
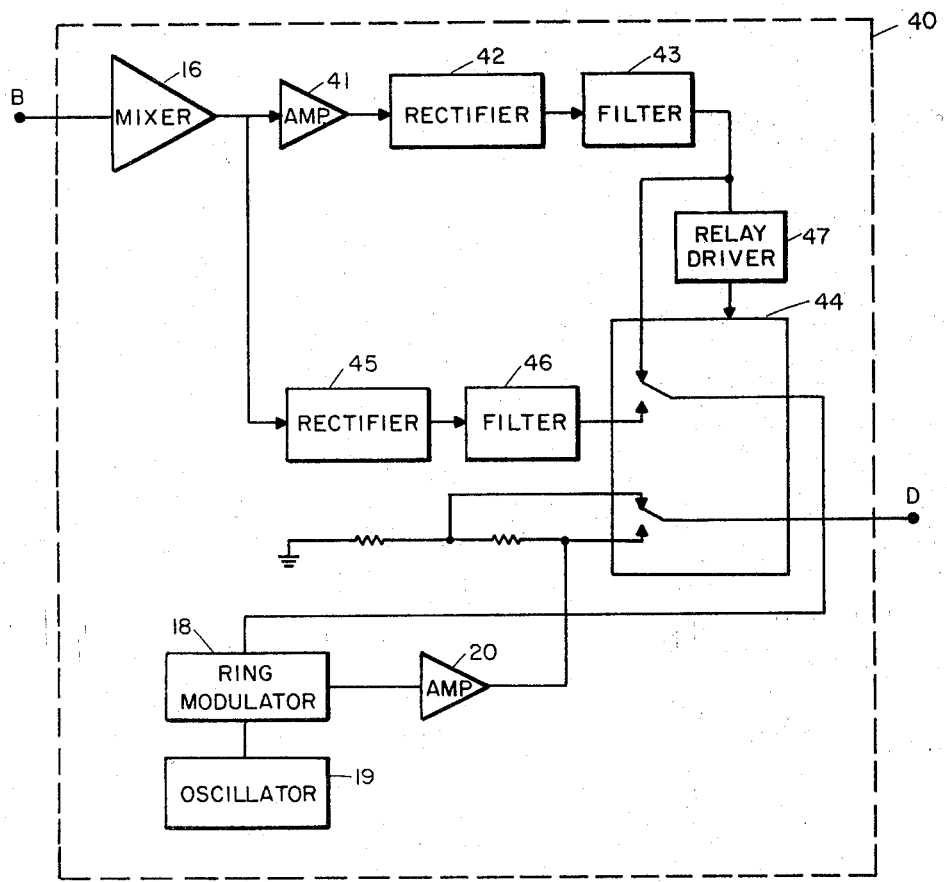
FIGURE 2 is a block diagram of an alternative embodiment of the invention for a portion of the circuitry of FIGURE 1.

FIG. 2 illustrates an alternative embodiment of the dotted line portion 40 of FIG. 1. As the signals from junction B are coupled into the mixer 16, the output from the mixer 16 is coupled to the ring modulator 18, either through tthe amplifier 41 and rectifier 42, or the rectifier 45, depending upon the condition of the switch 44. As long as the output from rectifier 42 remains below some predetermined value, for example, 10 volts, the relay driver circuit 47 causes the switch contacts to remain in the "up" position, as illustrated. When the output from mixer 16 exceeds the predetermined value, the switch contacts go to the "down" position, thus eliminating the amplifier 41 from the circuit path, the rectifier 42 corresponding to rectifier 45 and the filter 43 corresponding to filter 46. Therefore, the operation of the central automatic gain control stage 40, according to FIG. 2, has a level switch trip function whereby an additional amplifier stage is used whenever the output from the rectifier 42 is below a given level.

Figure 3:
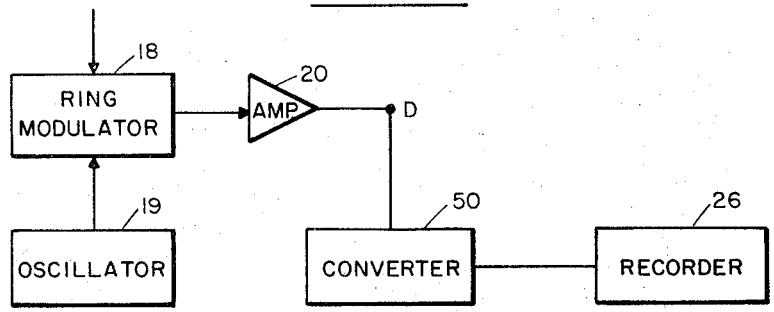
FIGURE 3 is a block diagram of circuitry according to the invention for modifying the circuitry of FIGURE 1.

FIG. 3 is a block diagram of a modification of the circuitry according to FIG. 1. The output of the ring modulator 18 and amplifier 20 is coupled into a converter stage 50, the output of which is coupled into the recorder 26. The converter stage 50 could be any conventional converter circuit that would provide information to the recorder 26 relating to the amount of gain change which has been effected in the individual amplifier channels. It should be appreciated that while the converter means is illustrated as being connected to the output of the amplifier 20, modifications of the circuit would include, for example, taking the signal to the converter stage 50 from junction B, junction D, or any electrical point therebetween, as long as the signal to the converter means is representative of a function of the changes effected in the gain of the individual channels.

Figure 4:
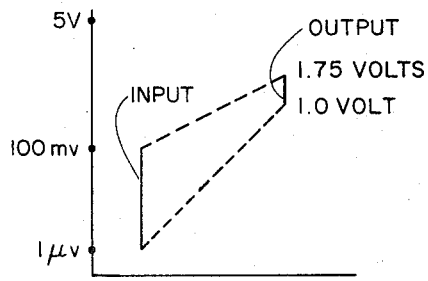
FIGURE 4 illustrates how the range of input voltages from a geophone station corresponds to the range of voltages at the output of one of the amplifiers according to the invention.

The utility of the circuit modification of FIG. 3 can be better appreciated while viewing the voltage ranges illustrated in FIG. 4. The input range from a seismic geophone station may vary, for example, from 1 microvolt up to 100 millivolts, whereas the output range, as seen at the recorder 26, may be, for example, from 1.0 to 1.75 volts. Since it may be desirable, when reproducing or examining the recorded signals, to determine the instantaneous gain of the amplifier system for any portion of the record, the simultaneous recording of the converter output will provide this information.

Figure 5:
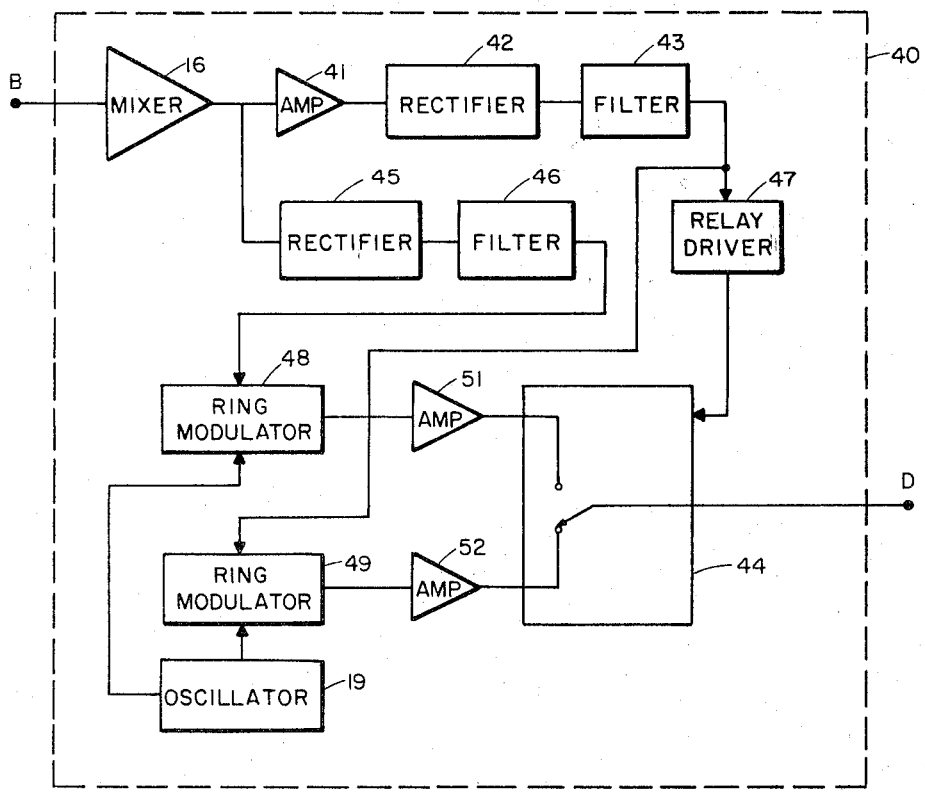
FIGURE 5 is a block diagram of an alternative embodiment of the invention of the circuit according to FIGURE 2.

FIG. 5 illustrates an alternative embodiment of the step level switching circuitry according to FIG. 2. As with the circuit of FIG. 2, the relay driver 47 causes the relay switch 44 to switch at some predetermined level from the rectifier 42. However, instead of causing a switching of the outputs from filters 43 and 46, as was illustrated in FIG. 2, a pair of ring modulators 48 and 49 are connected to the oscillator 19. The outputs from the modulators 48 and 49 are respectively coupled into the amplifiers 51 and 52. Junction D then represents the output from amplifier 51 or 52, depending upon the output level of rectifier 42.

Thus, it should be appreciated that there has been illustrated and described a method and apparatus for providing a master automatic gain control circuit for controlling the gain of a plurality of amplifiers, but which is open-loop and independent of the low frequency signal outputs of the amplifiers. Although the present invention has been described with respect to the preferred embodiments, nevertheless, various changes and modifications will become apparent to those skilled in the art from reading this disclosure. For example, the oscillator could operate at some frequency other than 4000 hertz. Likewise, a different type of gain control circuit could be used in lieu of that embodying a lamp and photoresistive units. It should be appreciated, also, that the circuitry according to the invention could be modified to have only a single input and single amplifier channel. Furthermore, the output from junction D could be coupled directly into the high frequency pass filter 27 or the lamp driver 28, thus by-passing the photoresistive units.

The embodiments of the invention in which an exclusive property or privilege is claimed are defined as follows:

1. An automatic gain control circuit for an amplifier comprising:
   input circuit means, including means connect an input signal to said amplifier;
   high frequency signal generating means for developing a control signal;
   circuit means to modulate said control signal as a function of a characteristic of said input signal; and
   means responsive to said modulated control signal for controlling the gain of said amplifier, said control signal being independent of the gain of said amplifier.

2. The automatic gain control circuit according to claim 1 wherein said characteristic comprises the amplitude of said input signal.

3. The automatic gain control circuit according to claim 2, including recording means connected to the output of said amplifier for recording said output signal.

4. The automatic gain control circuit according to claim 3, including converter means connected between said circuit modulation means and said recording means for recording a signal as a function of the amount of gain control effected in said amplifier.

5. The automatic gain control circuit according to claim 1, including step level switch means within said circuit modulation means.

6. An automatic gain control circuit for a plurality of amplifiers comprising:
   a plurality of input circuit means, including means to respectively connect a plurality of input signals to said plurality of amplifiers;
   high frequency signal generating means for developing a control signal;
   circuit means to combine said plurality of input signals;
   circuit means to modulate said control signal as a function of a characteristic of said combined input signals; and
   means responsive to said modulated control signal for controlling the gain of said amplifiers, said control signal being independent of the gain of said amplifiers.

7. The automatic gain control circuit according to claim 6 wherein said characteristic comprises the amplitude of said plurality of input signals.

8. The automatic gain control circuit according to claim 7, including recording means connected to the outputs of said plurality of amplifiers for recording said output signals.

9. The automatic gain control circuit according to claim 8, including converter means connected between said circuit modulation means and said recording means for recording a signal as a function of the amount of gain control effected in said plurality of amplifiers.

10. The automatic gain control circuit according to claim 6, including step level switch means within said circuit modulation means.

References Cited

UNITED STATES PATENTS

| | | | |
|---|---|---|---|
| 2,838,742 | 6/1958 | McManis | 340—15.5 |
| 3,083,341 | 3/1963 | White et al. | 330—137 X |
| 3,158,818 | 11/1964 | Plumpe | 330—136 X |

ROY LAKE, *Primary Examiner.*

J. B. MULLINS, *Assistant Examiner.*

U.S. Cl. X.R.

330—132, 136, 137; 340—15.5